(12) United States Patent
Purves et al.

(10) Patent No.: US 10,372,712 B2
(45) Date of Patent: Aug. 6, 2019

(54) CONVERGED MERCHANT PROCESSING APPARATUSES, METHODS AND SYSTEMS

(71) Applicant: Visa International Service Association, San Francisco, CA (US)

(72) Inventors: Thomas Purves, San Francisco, CA (US); Raul Leyva, Round Rock, TX (US); Alan Johnson, Cedar Park, TX (US); John C. Wang, Belmont, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 379 days.

(21) Appl. No.: 15/017,845

(22) Filed: Feb. 8, 2016

(65) Prior Publication Data

US 2016/0232513 A1 Aug. 11, 2016

Related U.S. Application Data

(60) Provisional application No. 62/113,515, filed on Feb. 8, 2015.

(51) Int. Cl.
*G06Q 20/10* (2012.01)
*G06Q 20/22* (2012.01)
*G06F 16/2457* (2019.01)
*G06Q 20/36* (2012.01)

(52) U.S. Cl.
CPC ..... *G06F 16/24573* (2019.01); *G06Q 20/227* (2013.01); *G06Q 20/36* (2013.01)

(58) Field of Classification Search
CPC .............................. G06Q 20/10; G06Q 20/20
USPC ............................................................ 705/39
See application file for complete search history.

(56) References Cited

U.S. PATENT DOCUMENTS

| | | | | |
|---|---|---|---|---|
| 7,167,844 | B1* | 1/2007 | Leong | G06Q 30/04 705/37 |
| 7,401,731 | B1* | 7/2008 | Pletz | G06Q 20/24 235/375 |
| 9,373,112 | B1* | 6/2016 | Henderson | G06Q 20/40 |
| 2009/0172706 | A1* | 7/2009 | Jones | H04L 29/08846 719/326 |
| 2012/0215701 | A1* | 8/2012 | Mehta | G06Q 20/12 705/75 |
| 2014/0258110 | A1* | 9/2014 | Davis | G06Q 20/227 705/41 |

* cited by examiner

*Primary Examiner* — Hai Tran
(74) *Attorney, Agent, or Firm* — Loeb & Loeb LLP

(57) ABSTRACT

The CONVERGED MERCHANT PROCESSING APPARATUSES, METHODS AND SYSTEMS ("CMP") facilitates the generation of user accounts with merchants. The user may be logged into an electronic wallet or issuer account, and may initiate an account generation process with a one-click mechanism. The CMP may provide information to the merchant in order to facilitate the generation of the account after receiving data from the electronic wallet or issuer.

20 Claims, 14 Drawing Sheets

CONVERGED MERCHANT PROCESSING APPARATUSES, METHODS AND SYSTEMS

PRIORITY AND CROSS-REFERENCES

This application claims priority to U.S. Patent Application Ser. No. 62/113,515, filed Feb. 8, 2015 and entitled "CONVERGED MERCHANT PROCESSING APPARATUSES, METHODS AND SYSTEMS." This application claims priority to U.S. patent application Ser. No. 13/966,098, filed Aug. 13, 2013 and entitled "PAYMENT PLATFORM INTERFACE WIDGET GENERATION APPARATUSES, METHODS AND SYSTEMS." This application cross-references U.S. patent application Ser. No. 13/802,658, filed Mar. 13, 2013 and entitled "MULTI-DIRECTIONAL WALLET CONNECTOR APPARATUSES, METHODS AND SYSTEMS", which is a continuation-in-part and claims priority under 35 U.S.C. § 120 to U.S. patent application Ser. No. 13/624,779, filed Sep. 21, 2012 and entitled "WALLET SERVICE ENROLLMENT PLATFORM APPARATUSES, METHODS AND SYSTEMS", which is a continuation-in-part and claims priority under 35 U.S.C. § 120 to U.S. patent application Ser. No. 13/589,053, filed Aug. 17, 2012 and entitled "WALLET SERVICE ENROLLMENT PLATFORM APPARATUSES, METHODS AND SYSTEMS," which in turn claims priority under 35 USC § 119 to: U.S. provisional patent application Ser. No. 61/525,168 filed Aug. 18, 2011, entitled "WALLET SERVICE ENROLLMENT PLATFORM APPARATUSES, METHODS AND SYSTEMS," U.S. provisional patent application Ser. No. 61/537,421 filed Sep. 21, 2011, entitled "CONSUMER WALLET ENROLLMENT APPARATUSES, METHODS AND SYSTEMS," U.S. provisional patent application Ser. No. 61/588,620 filed Jan. 19, 2012, entitled "CONSUMER WALLET ENROLLMENT APPARATUSES, METHODS AND SYSTEMS," and U.S. provisional patent application Ser. No. 61/668,441 filed Jul. 5, 2012, entitled "REFERENCE TRANSACTION APPARATUSES, METHODS AND SYSTEMS." This application also cross-references U.S. provisional patent application Ser. No. 61/612,368 filed Mar. 18, 2012, entitled "BIDIRECTIONAL WALLET CONNECT SERVICE APPARATUSES, METHODS AND SYSTEMS,". The entire contents of the aforementioned applications are expressly incorporated by reference herein.

This application for letters patent disclosure document describes inventive aspects directed at various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations are directed generally to digital wallets and more particularly, to CONVERGED MERCHANT PROCESSING APPARATUSES, METHODS AND SYSTEMS or CMP. More specifically, the technology described in this patent document relates more particularly to systems and methods for enrolling a user in a membership account without a need for the user to manually input his or her personal information.

BACKGROUND

Consumers using the World Wide Web make purchases at electronic commerce merchants using credit cards. In order to gain access to a service provided by a merchant, a user may first be required to create an account with the merchant. For example, in order to purchase an item from a website operated by a merchant or receive special offers from the merchant, the user may first be required to create an account with the merchant. Typically, creating an account with a service provider requires the user to provide detailed personal information. Such detailed personal information may include the user's name, home address, telephone number, email address, and payment information (e.g., credit card number), among other information. In providing this information, a user may be required to manually enter data via an input device (e.g., a keyboard of a laptop or desktop computer or a touchscreen of a mobile phone or tablet, etc.). The manual entry of this information may be time-consuming, and the user may make mistakes in entering the data. Accounts may be created using alternative methods (e.g., signing up for an account over the phone by speaking to a representative of the service provider, etc.), but these alternative methods may be time-consuming and may lead to erroneous data being recorded by the service provider as well as increased data transmissions over computer networks as data has to be transmitted multiple times in order to address such situations.

BRIEF DESCRIPTION OF THE DRAWINGS

The accompanying appendices and/or drawings illustrate various non-limiting, example, innovative aspects in accordance with the present descriptions.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

SUMMARY

The present disclosure is directed to a computer-implemented method, system, and non-transitory computer-readable storage medium for enrolling a user in a membership account. In an example computer-implemented method and system, a payment option to a payment service provider can be added as follows. A computer system associated with a merchant identifies payment information stored within a profile of a user where the merchant is the custodian of the profile. The computer system queries a payment service provider for a user account associated with the user. If the user account associated with the payment service provider does not contain the payment information, then a user request is generated to cause the payment service provider to add a payment option to the user account based on the payment information. The computer system then transmits the payment information to the payment service provider in response to the received request.

DETAILED DESCRIPTION

Various embodiments of the CMP may be configured to facilitate the generation of user accounts from a virtual wallet application, issuer website, and/or the like.

Figure 1:
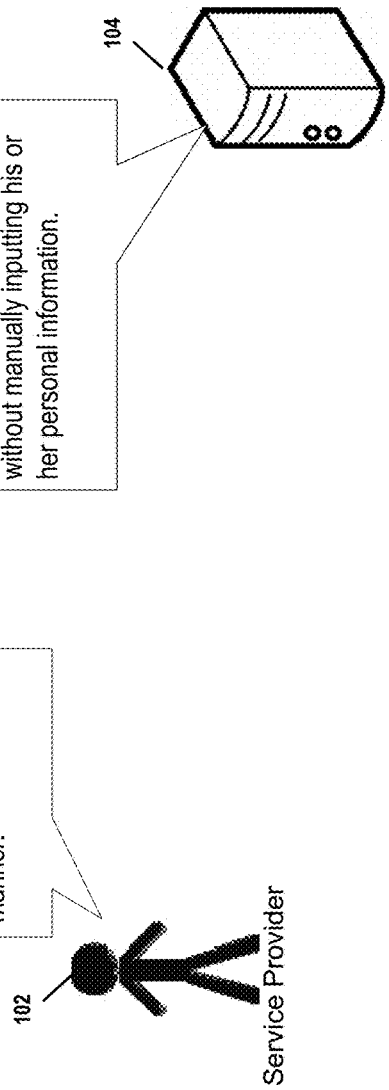
FIG. 1 shows a block diagram illustrating example features of the account creation processes described herein.

FIG. 1 shows a block diagram illustrating example features of the account creation processes described herein. As illustrated in FIG. 1, a service provider 102 may wish to enroll users into a membership account in an easy, automated manner. In an example, the service provider 102 is a merchant that operates both a physical store (i.e., a "brick and mortar" store) and an online store. The merchant may wish, specifically, to enroll in-store shoppers in membership accounts with its online store in a convenient, automated manner that does not require the shopper to manually enter his or her personal information (e.g., the shopper's name, home address, telephone number, email address, and payment information, etc.).

Conventionally, the merchant's physical store may have little or no connection to its online store, such that in-store shoppers do not necessarily become online shoppers. The account creation approach 104 described herein helps to remedy this issue for merchants by converting transactions at the merchant's physical store (e.g., transactions at a physical Point of Sale (POS) device) into pre-registered accounts at the merchant's online store. Creation of a pre-registered account is based on existing information that is already on file for the customer, such that the customer is enrolled in the account without manually inputting his or her information. In another example, the service provider 102 is any entity that provides a service for which consumers must register. Thus, it should be understood that the systems and methods described herein are not limited to the examples involving merchants described below.

Figure 2:
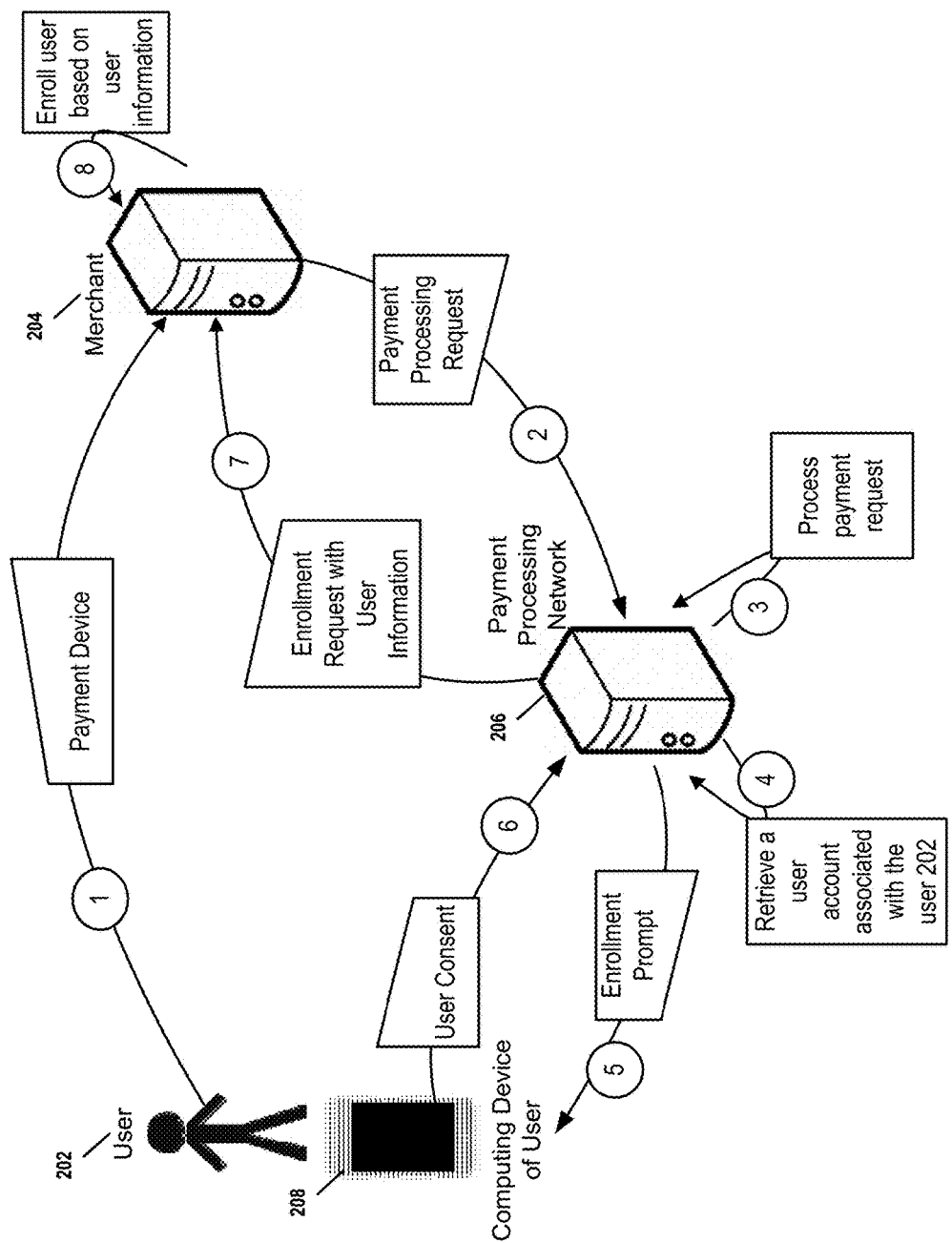
FIG. 2 is a block diagram illustrating example interactions between a user, merchant, and payment processing network for enrolling the user into a membership account with the merchant.

FIG. 2 is a block diagram illustrating example interactions between a user 202, merchant 204, and payment processing network 206 for enrolling the user 202 into a membership account with the merchant 204. As described above, a physical store operated by the merchant 204 may have little or no connection to an online store operated by the merchant 204, such that in-store shoppers do not necessarily become online shoppers. As described below with reference to FIG. 2, the account creation processes described herein may help the merchant 204 increase the user-base of its online store by converting transactions at a POS device of the physical store into pre-registered accounts at the online store. Specifically, when the user 202 makes a payment at the physical store of the merchant 204 using a payment device, the user 202 may be prompted via his or her computing device 208 to enroll in a membership account with the merchant 204. The membership account may be, for example, a membership account in the online store of the merchant 204. If the user 202 consents, the payment processing network 206 transmits personal information for the user 202 to the merchant 204, and the merchant 204 can then proceed to enroll the user 202 without requiring additional input from the user 202. These features are described in greater detail below.

As illustrated in FIG. 2, initially, the user 202 provides his or her payment device to the merchant 204 in order to make a payment to the merchant 204. The providing of the payment device to the merchant 204 occurs at a physical POS device associated with the merchant 204 and may occur in the physical store of the merchant 204, for example. In providing the payment device to the merchant 204, the user 202 provides at least an account number and any other information necessary to complete the payment transaction with the merchant 204. To complete this transaction, a payment processing request is transmitted from the merchant 204 to a payment processing network 206. The payment processing network 206 is operated, for example, by Visa, MasterCard, or another company that offers similar payment processing services. In an example, the payment processing network 206 is the VisaNet payment processing network operated by Visa. The payment processing request is transmitted from the POS device associated with the merchant 204, and the payment processing request may include the account number or a representation thereof (e.g., a token, cryptogram, or another representation of the account number) and a merchant identifier (i.e., a "merchant ID") associated with the merchant 204. The account number may be, for example, a credit card number, a debit card number, a bank account number, a number associated with a digital payment service, a pre-paid card number, or another such account number. The merchant ID is any data (e.g., a number, sequence of characters, combination of numbers and letters, etc.) that uniquely identifies the merchant 204.

After receiving the payment processing request including the account number (or representation thereof, as described above) and the merchant ID, the payment processing network 206 processes the payment processing request. This processing includes conventional processing required to complete the payment transaction. Such conventional processing is known to those of ordinary skill in the art and may involve additional entities not depicted in FIG. 2 (e.g., an acquirer, an issuer, etc.). The payment processing network 206 also performs additional actions as part of the exemplary account creation process described herein. Specifically, the payment processing network 206 may determine if the merchant 204 is enrolled in a service for automatically enrolling in-store customers into membership accounts. This determination may include querying a database based on the merchant ID included in the payment processing request, where the results of the query indicate if the merchant 204 is enrolled in the service. If the merchant 204 is not enrolled in the service, the payment processing network 206 performs only the conventional payment processing steps for completing the payment transaction and does not perform the steps described below for creating an account.

If it is determined that the merchant 204 is enrolled in the service, the payment processing network 206 retrieves a user account associated with the user 202. The retrieval of the user account may include querying a database based on the account number or representation thereof included in the payment processing request. In an example, the user account associated with the user 202 is a user account for a digital payment service offered by the payment processing network 206. For instance, in an example where the payment processing network 206 is the VisaNet payment processing network, the payment processing network 206 determines if the user 202 has a user account with the Visa checkout digital payment service. If the user 202 is enrolled in the digital payment service, the payment processing network 206 then retrieves the user account for the user 202, where the user account comprises personal information for the user 202.

Such personal information may include the user's name, home address, email address, telephone number, and payment information, among other information. It should be understood that the description herein regarding the digital payment service is exemplary only and that the user account retrieved by the payment processing network 206 need not be associated with a digital payment service. Specifically, the payment processing network 206 may retrieve any type of user account including user information that is adequate for carrying out the account creation steps described below. In an example, the user information of the user account is stored in a data structure that is included on one or more non-transitory, computer-readable storage mediums.

Along with the above-described personal information, the retrieved user account also includes address information for communicating with a computing device 208 that is associated with the user 202. Specifically, in an example, the computing device 208 is a mobile phone associated with the user 202, and the address information is information that allows for communication with the mobile phone. The address information may comprise, for example, an email address associated with the user 202, phone number associated with the computing device 208 (e.g., a mobile phone number to which a Short Message Service (SMS) message may be sent, etc.), or another type of address information for communicating with the computing device 208 (e.g., an IP address, MAC address, etc.). As described above, the computing device 208 may be a mobile phone, and in other examples, the computing device 208 is a a tablet computer, a laptop computer, a desktop computer, or another device.

Using the address information included in the retrieved user account, the payment processing network 206 transmits computer-readable instructions to the computing device 208 of the user 202, where the computer-readable instructions cause the computing device 208 to prompt the user 202 to enroll in a membership account with the merchant 204. For example, the payment processing network 206 may transmit a command to the mobile phone 208 of the user 202, where the command is capable of causing the mobile phone 208 to prompt the user 202 to enroll in the membership account with the merchant 204.

The user 202 may be prompted to enroll in the membership account with the merchant 204 while the user 202 is still completing the in-store purchase transaction with the merchant 204. In another example, the user 202 is prompted to enroll in the membership account shortly after the completion of the in-store purchase transaction with the merchant 204. Thus, in both examples, the user 202 is prompted to enroll in a membership account with a relevant merchant at a relevant point in time (i.e., the user 202 is prompted to enroll with the merchant 204 with whom the user 202 is currently transacting or very recently transacted).

In an example, the retrieval of the user account provides address information that allows the payment processing network 206 to communicate with the computing device 208 that is running a Visa checkout Software Development Kit (SDK). The Visa checkout SDK comprises a code library embedded in an online banking app or website that is executed or accessed via the computing device 208. The online banking app or the website may be, for example, a mobile app or website offered by an issuer of a payment device that is associated with the user 202. The online banking app or the website displays a prompt that prompts the user 202 to enroll in an online store of the merchant 204. Details of this example including the online banking app or website of the issuer are described below with reference to FIG. 3.

The payment processing network 206 receives a response from the computing device 208 indicating consent from the user 202 to enroll in the membership account with the merchant 204. Based on the response, the payment processing network 206 transmits an enrollment request to a computer system associated with the merchant 204, where the enrollment request includes user information from the retrieved user account for the user 202. In the example described above where the payment processing network 206 is VisaNet and the user account is associated with the Visa checkout digital payment service, the transmitting of the enrollment request may include sending a Visa checkout information "payload" to the merchant 204. The payload contains information such as the name, billing address, shipping information, account information, email, and phone number for the user 202.

Based on the user information included in the enrollment request, the merchant 204 can enroll the user 202 in a membership account with the online store of the merchant 204. Thus, the user 202 is enrolled in the membership account based on pre-existing account information that is already on file (e.g., the existing user information on file with Visa checkout, etc.), and the user 202 is not required to manually re-enter his or her personal information. After enrolling in the membership account, information on purchases made by the user 202 in the physical store of the merchant 204 is automatically logged and made available via the user's membership account in the online store of the merchant 204.

The exemplary account creation process described herein may be easily integrated into existing payment systems and conventions because the triggering event for the account creation process is a conventional payment using a payment device (e.g., using a traditional credit card) at a POS terminal, as described above. Both the user 202 and the merchant 204 can opt into or out of the service. For example, as described above, before performing the automatic account creation steps, the payment processing network 206 may first determine if the merchant 204 is enrolled in the service. The payment processing network 206 may make a similar determination as to whether the user 202 has opted into or out of the service and may or may not perform the account creation steps based on this determination. For example, the payment processing network 206 may query a database based on the user's account number, with the results of the query indicating if the user 202 has opted into or out of the service.

It should be understood that although the payment processing network 206 is depicted in FIG. 2 as being a single component (i.e., a single computer or server, as illustrated in the figure), the payment processing network 206 may comprise multiple computers, servers, and/or additional equipment connected in a networked arrangement. Similarly, it should be understood that although the merchant 204 is depicted as being a single component, the merchant 204 may comprise a plurality of components and systems. In an example, the POS device of the merchant 204 is located at a physical store of the merchant 204, and computer systems and servers of the merchant 204 are located outside of the physical store for operating the online store of the merchant 204.

Figure 3:
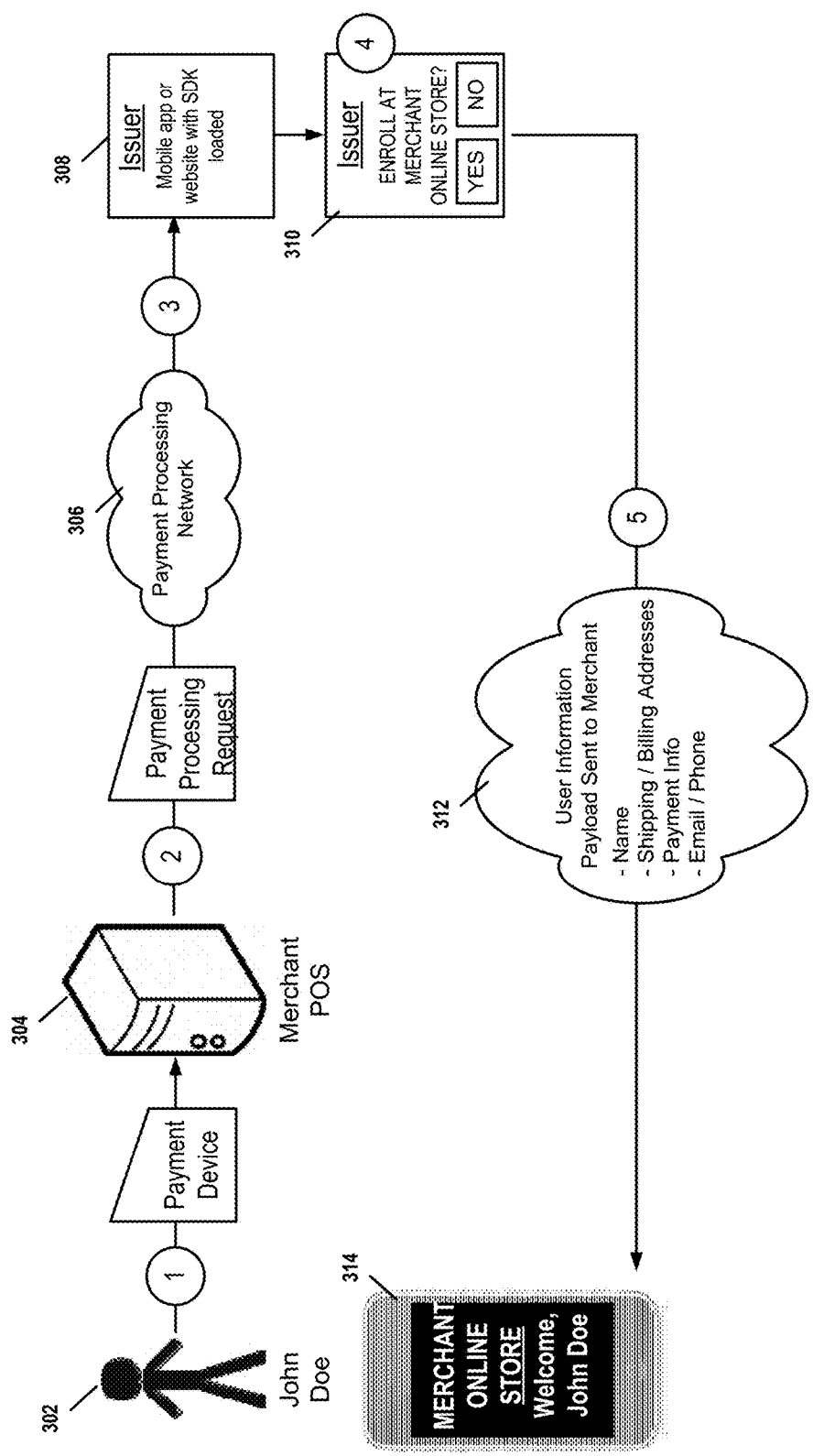
FIG. 3 is a block diagram depicting a user information payload being sent to a merchant to enable a user to create a membership account with the merchant.

FIG. 3 is a block diagram depicting a user information payload 312 being sent to a merchant to enable a user 302 to create a membership account with the merchant. In FIG. 3, initially, the user 302 provides his or her payment device to the merchant in order to make a payment to the merchant. The providing of the payment device to the merchant occurs at a merchant POS device 304 operated by the merchant and may occur, for example, within a physical store of the merchant. The merchant may be enrolled in a service for converting transactions at the physical POS device 304 into pre-registered accounts at the merchant's online store.

To complete the payment transaction, a payment processing request is transmitted from the merchant POS device 304 to a payment processing network 306. The payment processing request includes an account number associated with the user 302 or a representation thereof (e.g., a token, cryptogram, or another representation of the account number), among other information. The account number may be a credit card number or a debit card number, for example. The payment processing network 306 (e.g., VisaNet) inspects the payment processing request received from the merchant POS device 304 and makes a number of determinations based on the account number. First, the payment processing network 306 determines, based on the account number, if the user 302 has a user account with a service. In an example, the service is offered by the payment processing network 306. For instance, the service may be a digital payment service offered by the payment processing network 306, such as the Visa checkout service offered by Visa. The determination as to whether the user 302 has the user account with the service may include querying a database based on the user's account number to determine if the account number is associated with such a service.

Next, after determining that the user 302 has the user account with the service, the payment processing network 306 makes a determination as to whether the user account includes information that associates a mobile device or computer 314 with the user account. This determination may be made, for example, by retrieving the user account based on the account number and determining if the user account includes address information for communicating with the mobile device or computer 314. The address information may be, for example, a mobile phone number to which a Short Message Service (SMS) message may be sent, an email address, an instant messaging handle, or a social media identifier, among other types of information. If it is determined that the user account includes information that associates the mobile device or computer 314 with the user account, then the steps described below are performed to enroll the user 302 in a membership account with the merchant.

In carrying out the steps of the account enrollment process, the mobile device or computer 314 of the user 302 may execute a particular software development kit (SDK). In an example, the mobile device or computer 314 is running a Visa checkout SDK. The Visa checkout SDK may comprise a code library embedded in an online banking app or website 306 that is executed or accessed by the mobile device or computer 314. The online banking app or the website 306 may be, for example, a mobile app or website offered by an issuer of a payment device that is associated with the user 302.

When the payment processing network 306 i) determines that the user 302 has the user account with the service (e.g., the Visa checkout service), and ii) can connect the user account to the mobile device or computer 314 of the user 302, then the payment processing network 306 causes a command to be transmitted to the mobile device or computer 314. The command causes the mobile device or computer 314 to prompt the user 302 to enroll in a membership account with the merchant. The membership account may be, for example, a membership account with an online store operated by the merchant. An exemplary prompt 310 is illustrated in FIG. 3, showing the online banking app or website 306 of the issuer of the payment device (i.e., as displayed on the user's mobile device or computer 314 executing the aforementioned SDK) that prompts the user 302 to enroll in the online store of the merchant.

It should be understood that the use of the SDK and the issuer's online banking app or website is exemplary only, and that the user 302 may be prompted via the mobile device or computer 314 to enroll in the membership account in other ways. For example, the payment processing network 306 may cause a message (e.g., a text message or email) to be transmitted to the mobile device or computer 314, where the message prompts the user 302 to enroll in the membership account. In general, under the approaches described herein, any acceptable command or computer-readable instructions that cause the mobile device or computer 314 to prompt the user 302 to enroll in the membership account may be used.

The user 302 consents to enroll in the membership account by transmitting a response from the mobile device or computer 314 to the payment processing network 306 via the Internet. Based on this consent, a user information payload 312 is sent to the merchant. Specifically, the user information payload 312 is sent from the payment processing network 306 to the merchant. As described above, the payment processing network 306 determines if the user 302 has a user account with a service. In an example, the service is offered by the payment processing network 306 and may be, for example, the Visa checkout service offered by Visa. Such services maintain a variety of personal information for the user 302, including information such as the user's name, billing address, shipping address, payment information (e.g., information associated with a payment device), email address, phone number, and more. The payment processing network 306 retrieves this personal information from the user's account with the service and provides this information to the merchant via the user information payload 312.

Based on the user information payload 312 received by the merchant, the merchant can set up a membership account for the user 302. As described above, the membership account may be a membership account in an online store or mobile app operated by the merchant. In an example, the user's first experience at the merchant's online store or mobile app is streamlined and pre-configured for the user 302. For example, as illustrated at 314 in FIG. 3, after the user 302 creates account credentials for the online store or app (e.g., sets a username and password), the user 302 may be greeted with a personalized message and may begin making purchases immediately using the payment, shipping, and other personal information provided to the merchant by the payment processing network 306. The user 302 need not manually enter this information. By contrast, in a conventional approach, the user 302 is not able to complete a purchase transaction until he or she completes the time-consuming process of manually entering various personal information and payment information.

The account creation processes described herein may benefit the merchant by creating online shoppers from in-store shoppers. Further, these processes may benefit an issuer of a payment device because the user 302 pre-registers his or her payment device with the merchant and thereby reduces the chance that the user 302 will use a payment method other than the payment device from the issuer (e.g., PayPal, etc.). The user 302 may benefit from these processes because he or she enjoys a premium, streamlined experience in enrolling in the membership account and shopping at the online store. The payment processing network 306 may benefit because these processes may create a higher volume of usage of the payment device.

Figure 4:
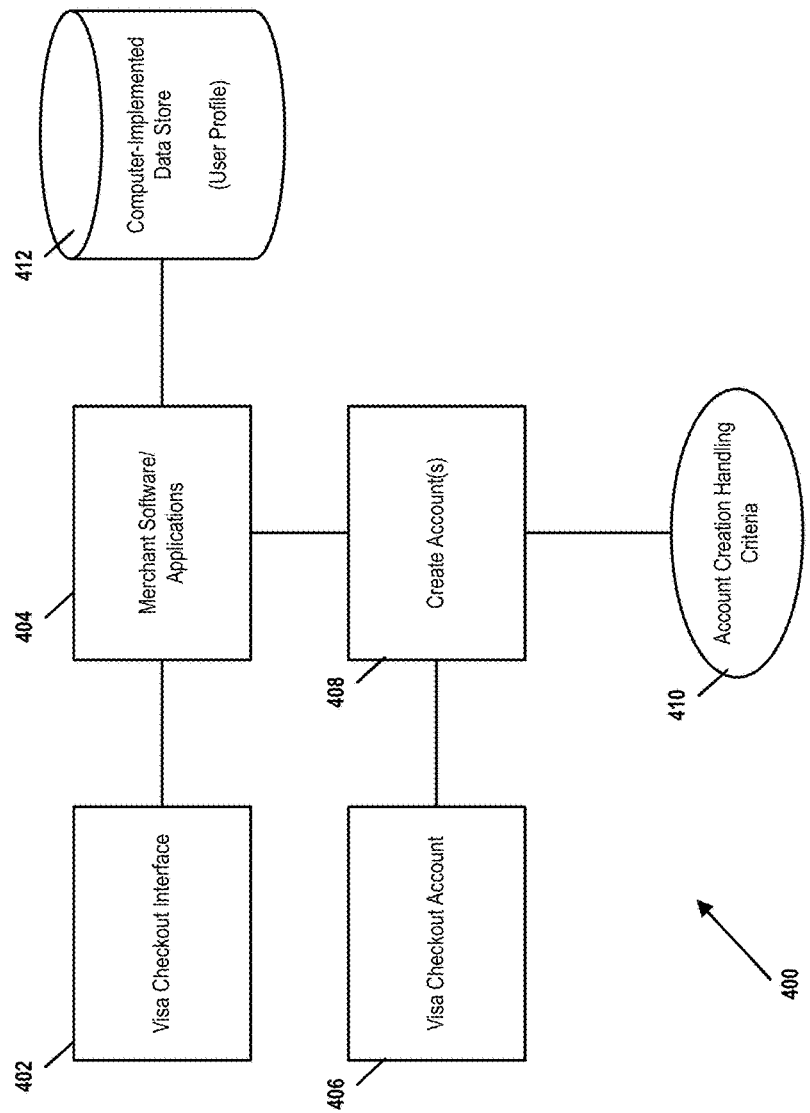
FIGS. 4 and 5 are block diagrams depicting account creation features.

FIG. 4 depicts at 400 a Visa checkout interface 402 integrated with merchant software/apps 404 for providing users with a consistent, hassle-free way to setup, link, and use Visa checkout accounts 406 with the merchant product using in part criteria 410. Payment information required for creating a checkout account at 408 may be obtained from a merchant with whom the user is transacting if the merchant has the information. The payment information can also be borrowed from currently entered information that was entered for a purpose different from creating a checkout account (e.g., making a purchase with a merchant).

More specifically, a payment option to a payment service provider can be added as follows. A computer system associated with a merchant identifies payment information stored within a profile 412 of a user where the merchant is the custodian of the profile. The computer system queries a payment service provider for a user account associated with the user. If the user account associated with the payment service provider does not contain the payment information, then a user request is generated to cause the payment service provider to add a payment option to the user account based on the payment information. The computer system then transmits the payment information to the payment service provider in response to the received request. This linking to a checkout account provided benefits such as, access to and utilization of card art, nickname, dynamic updates, meta data (e.g., expiration info), etc.

Figure 5:
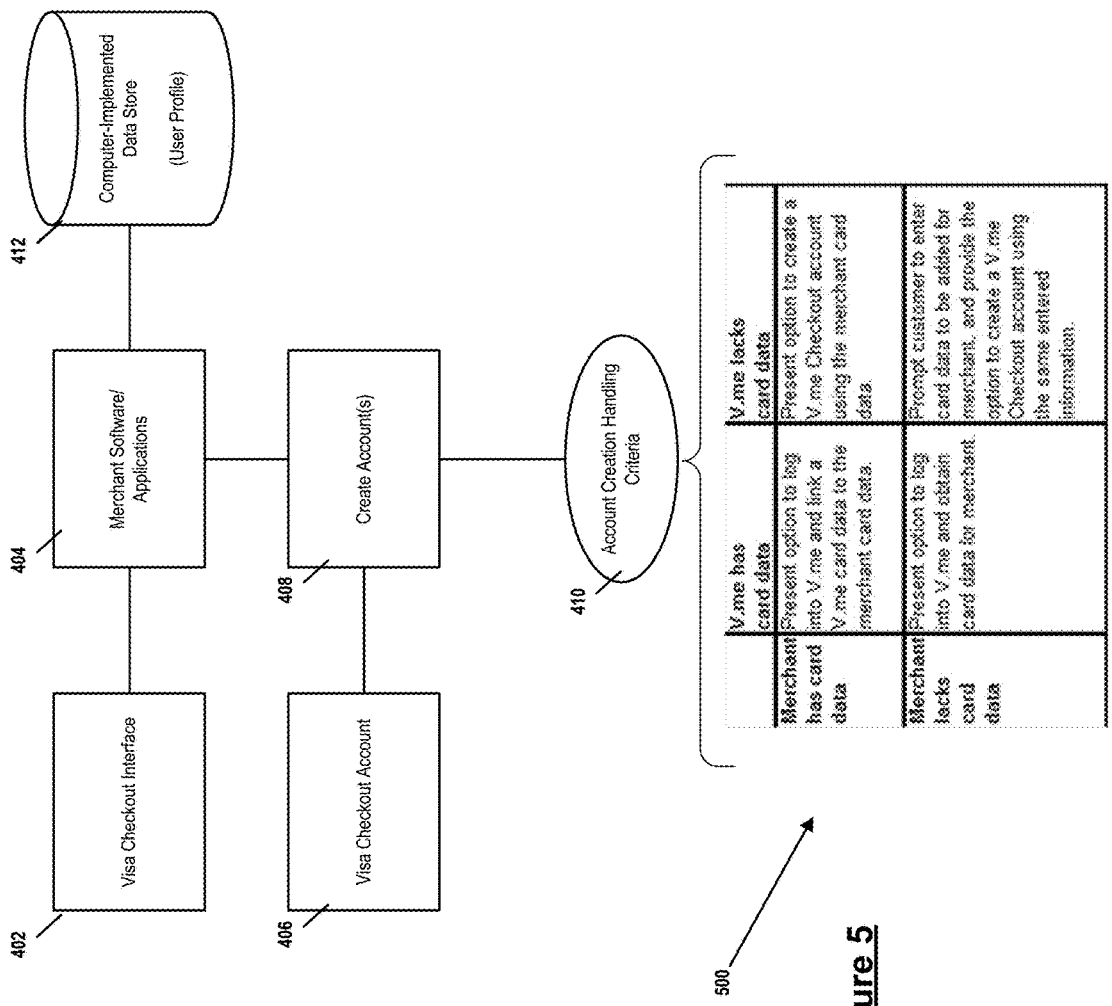

FIG. 5 shows at 500 different options for creating or linking a Visa checkout account based upon whether the merchant or V.me has the user's credit card information. For example if the card information is known to V.me but not the merchant, then user may log into V.me and select a card on file. If the card information is known to the merchant but not to V.me, then the user may request the merchant transmit the card information to V.me to create and link to a checkout account. If the card information is known to neither parties, then payment information entered by the user, such as while checking out or adding a card to the merchant app, may be used to create a checkout account. If the card information is known to both parties, then user may log into V.me to select a card on file for subsequent use.

Figure 6:
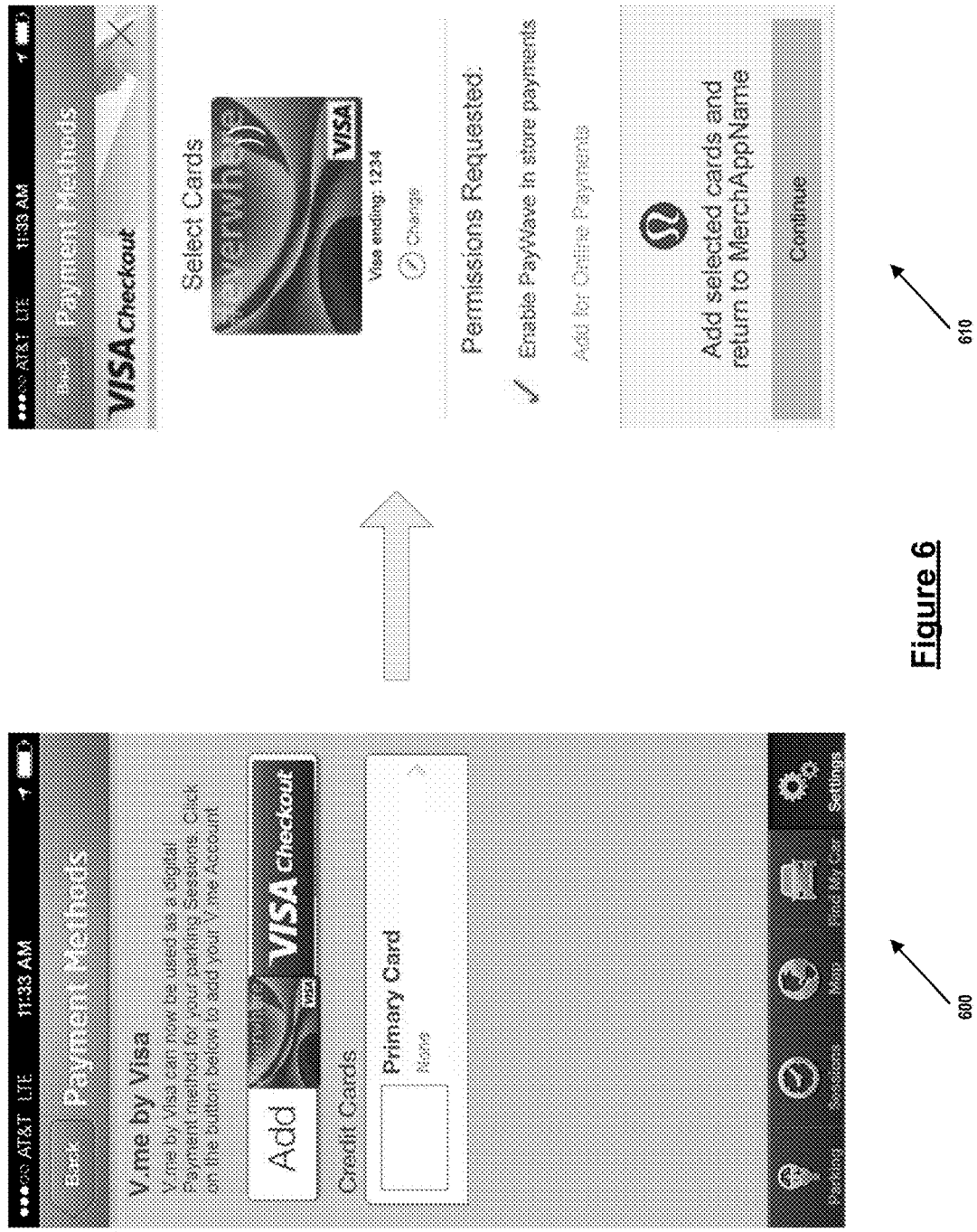
FIGS. 6-11 depict user interfaces for account creation and card adding operations.

FIG. 6 illustrates at 600 and 610 user interfaces for adding a card for a proximity, recognized user scenario. In this scenario, a consumer is recognized via device fingerprinting by the merchant application. This allows the consumer to be authenticated on the device by fingerprint. At 610, the consumer selects one or more cards and authorizes the adding of the selected card(s) to the application.

Figure 7:
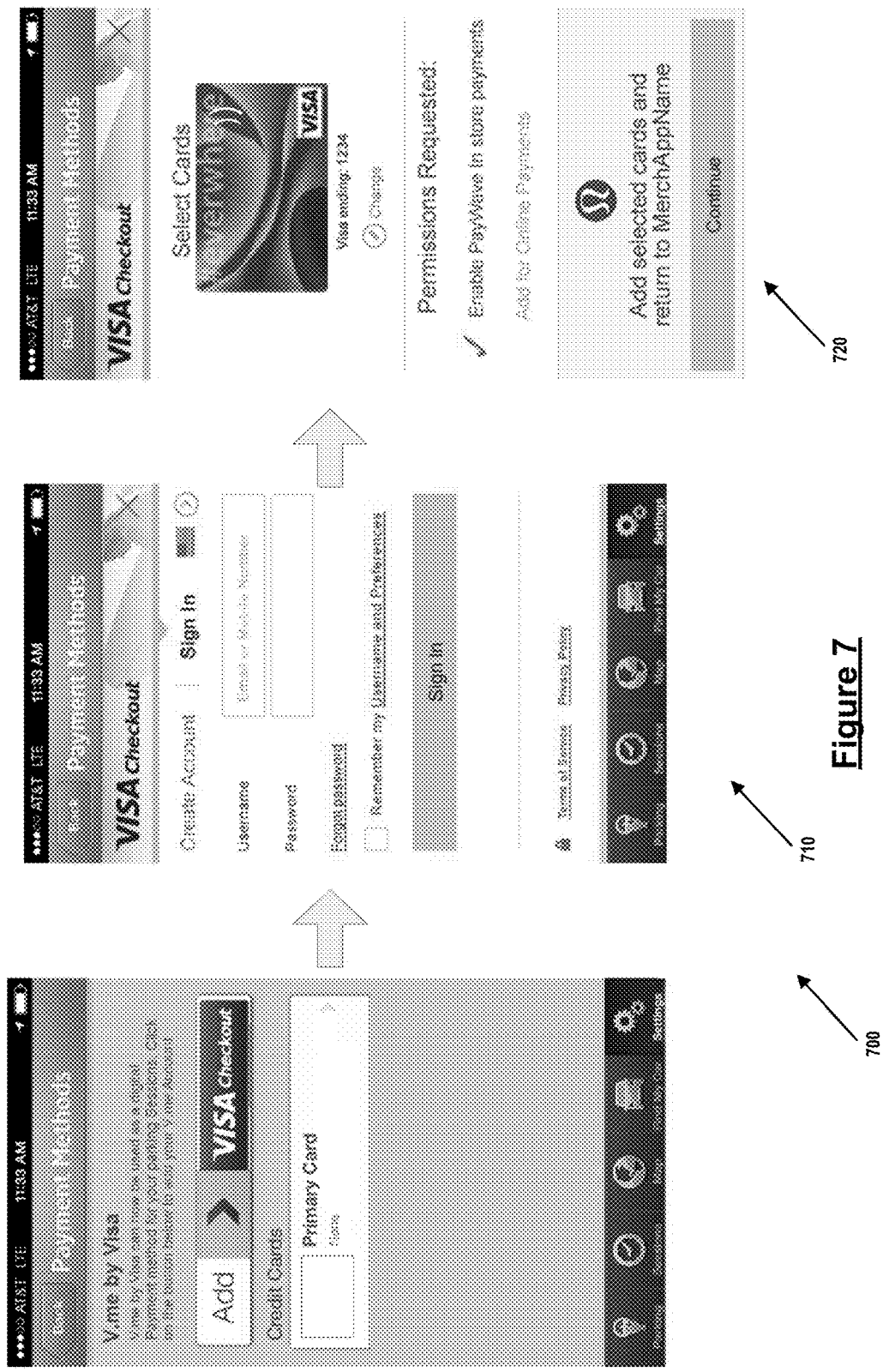

FIG. 7 involves a different scenario than FIG. 6. FIG. 7 depicts at 700, 710, and 720 user interfaces to add a card for a proximity, not recognized user scenario. Similar to FIG. 6, a consumer is recognized by device fingerprint by the merchant application. User interface 700 allows the consumer to select the option to add a card. After the consumer is fully authenticated, user interface 710 provides a Visa checkout interface for providing desired information (e.g., username, password, etc.). User interface 720 shows the selected card(s) as well as an authorization feature to add the selected card(s) to the merchant application.

Figure 8:
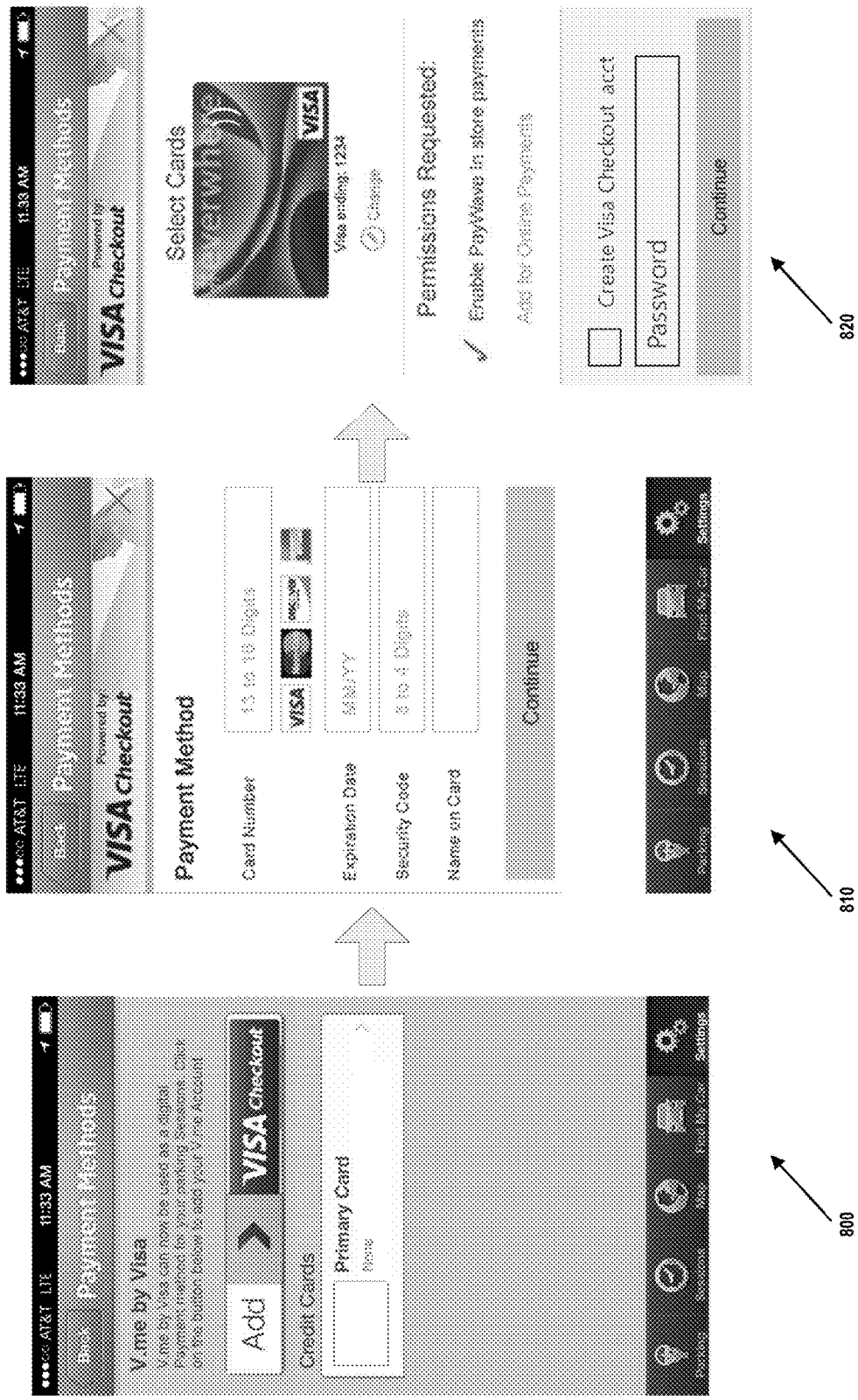

FIG. 8 depicts at 800, 810, and 820 user interfaces for adding a card for a proximity, not recognized user situation. A consumer selects the merchant's add card flow at user interface 800. User interface 810 collects the card information, such as card number, expiration date, security code, the name on card, etc. The consumer through user interface 820 authorizes this payment option and can create a Visa checkout account.

Figure 9:
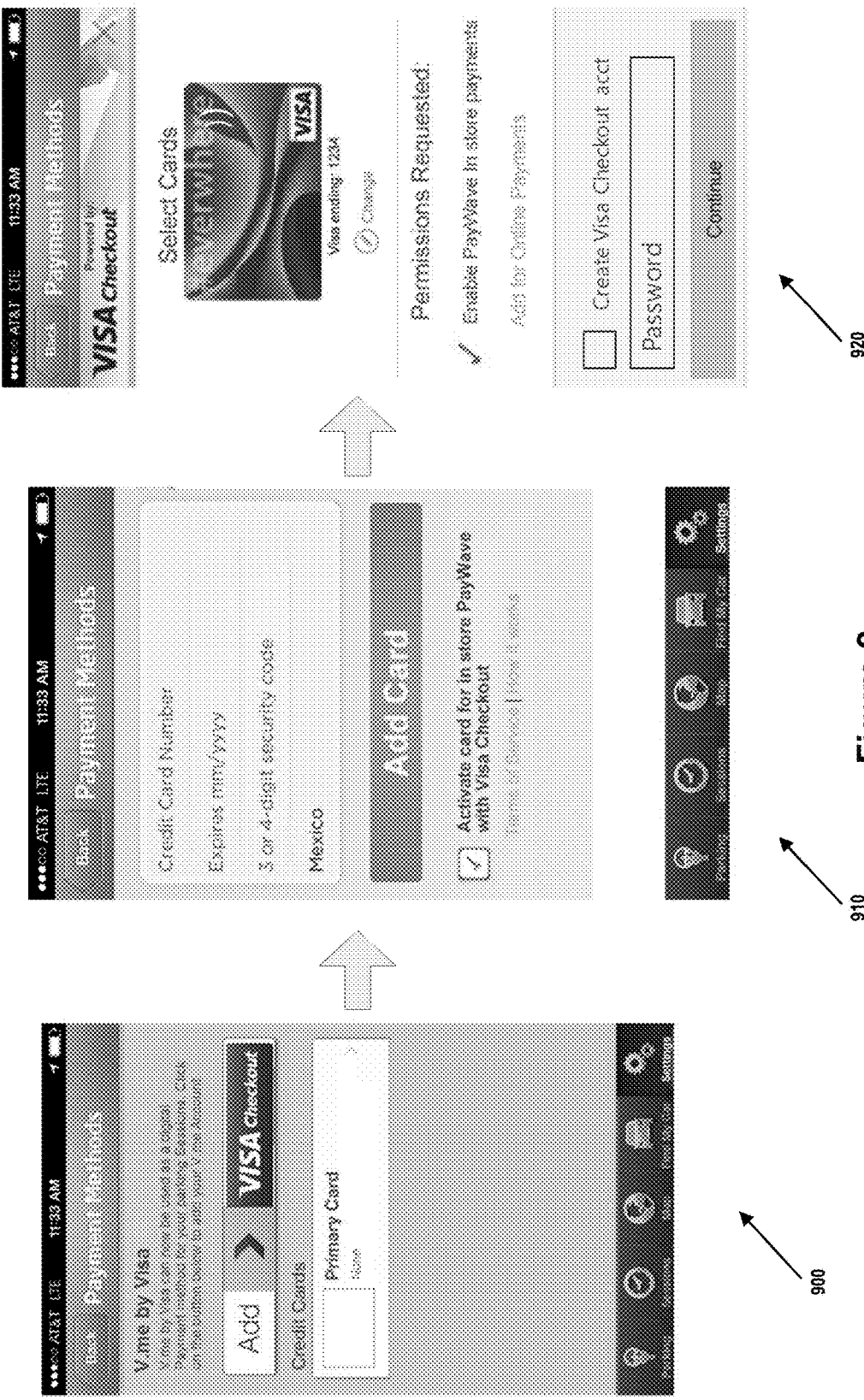

FIG. 9 depicts the merchant collecting card information through user interfaces 900, 910, and 920. At user interface 900, the consumer selects the merchant's add card flow. At user interface 910, the merchant collects the card information and send the information to V.me to complete. At user interface 920, the consumer authorizes this payment option and can create a Visa checkout account.

Figure 10:
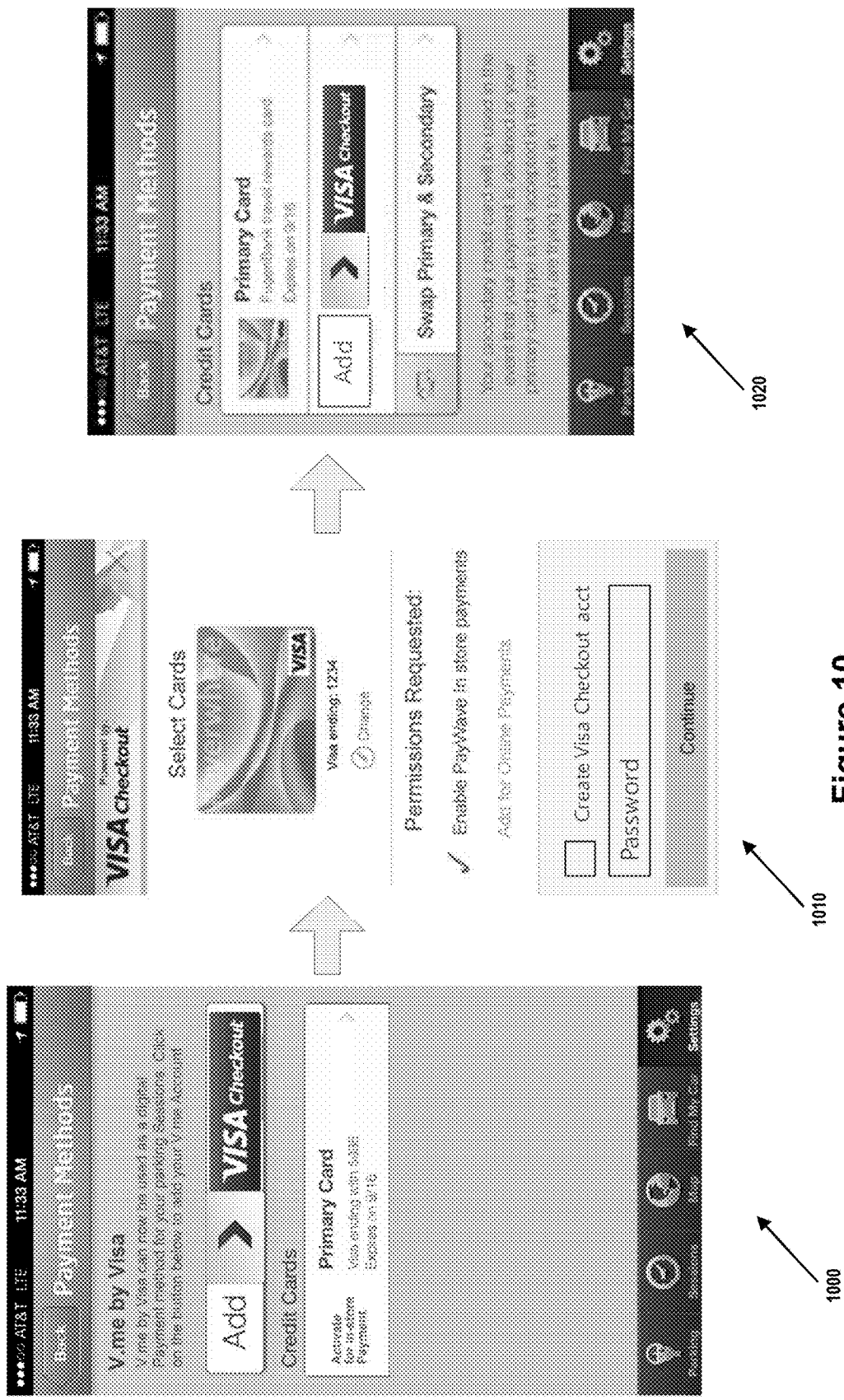

FIG. 10 depicts the situation where there is an existing card on file account, but is not activated for proximity/Visa checkout. As shown at user interface woo, the consumer has an existing card on file with the merchant. As shown at user interface 1010, the merchant provisions the card data and skips the ad card screen. User interface 1020 depicts the end of the processing with respect to this payment method.

Figure 11:
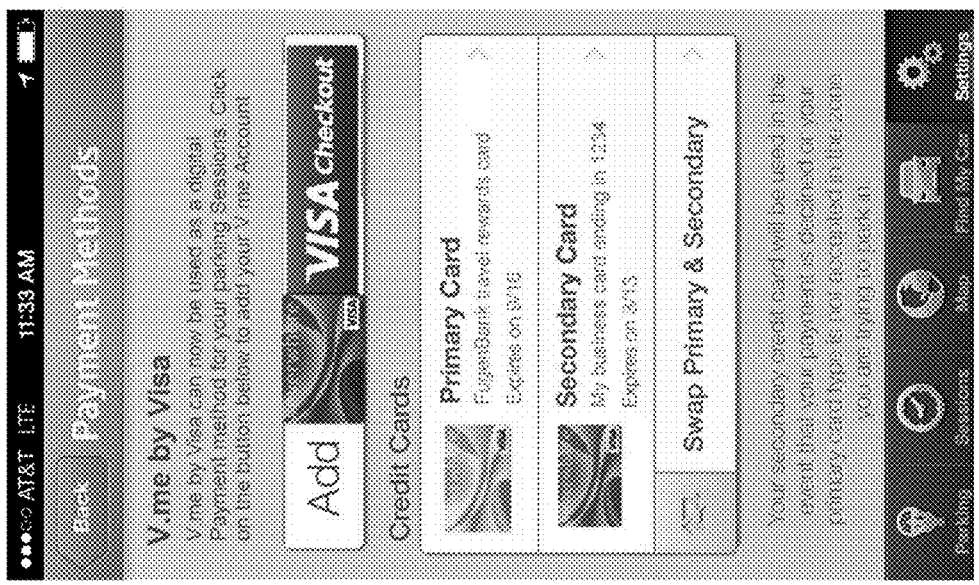

FIG. 11 illustrates the user interface 1100 that appears after adding one or more cards to a merchant app. After adding the card(s), Visa checkout can provide card art, nickname and metadata (expiry, current card validity, etc.). This helps the user to recognize which cards they are using, thereby providing more opportunity to reinforce issuer branding and maintaining relationships with dynamic updates and fewer failed transactions.

Figure 12:
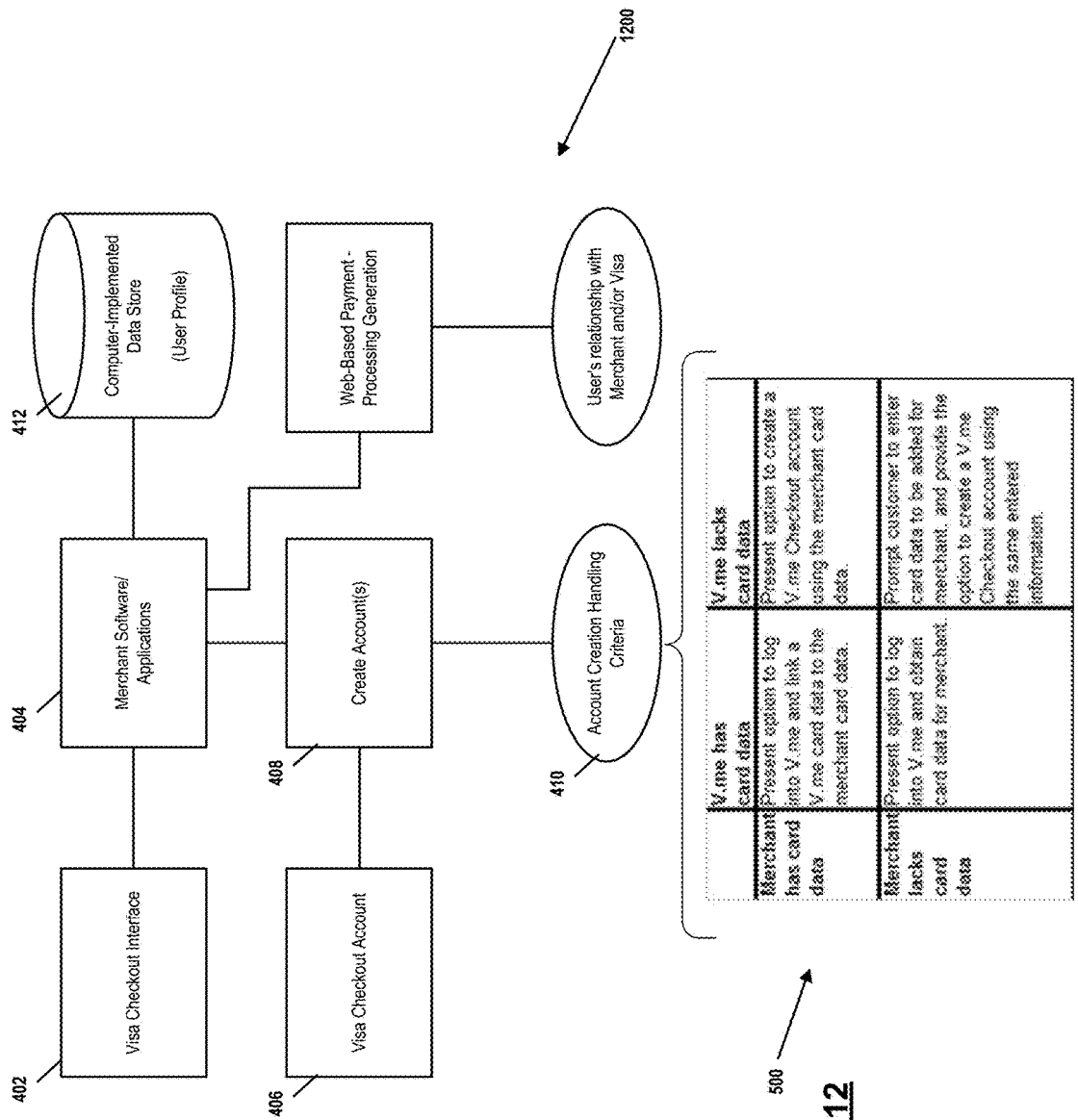
FIG. 12 is a block diagram depicting web-based payment-processing code dynamic generation.

FIG. 12 illustrates at 1200 that the system can also dynamically generate web-based payment-processing code for merchant websites according to merchant preferences. This feature can be used with or without the account creation features described herein. For the web-based payment processing code generation operations, a merchant website integrated with the system can provide personalized user interface and logic flow based on individual users' relationship with the merchant and Visa. For example, a personalized UI can be generated based on the user's relationship with the merchant and Visa. More specifically, each user may be presented with a different UI and/or logic flow depending on whether the user is known to the merchant and V.me.

For example, if a user has an account with the merchant but not with V.me, a merchant-centric UI may be presented. If a user has an account with V.me but not with the merchant, a V.me-centric UI may be presented.

Customizability of the UI can also depend on merchant status. For example, different categories of merchants may be afforded different levels of control over the UI. Trusted/partnered merchants may be granted more control over its UI than less established/non-partnered merchants. Also, the system can provide dynamic UI alteration/injection. This can be used where Visa and the merchant may dynamically alter the UI and logic flow of the merchant's UI. For promotional activities, Visa may alter select merchants' UI (e.g., display promotional messages or apply promotional discounts at checkout). Changes may automatically revert back after the promotional period expires.

The code generation process can proceed as follows. In one implementation, a merchant website may desire to design payment components for their online shopping checkout page so that the merchant may provide a widget (e.g., a pop-up box, a checkout light box, etc.) to a consumer to enter their billing information, such as but not limited to a credit card number, a debit card number, a PayPal account, and/or the like, and obtain user entered information for forwarding to a payment network. In one implementation, API-Tool may provide an API development platform, via which the merchant may select a desired API category, e.g., a user profile API, a user subscription API, checkout APIs, and/or the like. The API-Tool may then generate a block of code, e.g., in the form of eXtensible Markup Language (XML), etc., and the merchant may include the generated block of XML code into its web page so that a payment widget is incorporated. For example, a pop-up payment light box may be triggered when a consumer selects "proceed to pay." from the merchant website.

Within implementations, the API-Tool platform may generate user interface widget that is applicable to different merchants, and/or merchant site agnostic. For example, two or more different merchant sites may request a checkout widget at the API-Tool platform widget generation platform, and the API-Tool may receive requested parameters from the merchant sites and provide a widget package to the different merchant sites in a non-exclusive manner.

In another implementation, the API-Tool platform facilitates parties such as sellers and/or merchants to add payment acceptance to their applications or websites with a simple integration. In some embodiments, a social payment integration is facilitated that may allow the creation and/or customization of social network applications by API-Tool components. In one embodiment, the API-Tool platform allows sellers (or developers working for sellers) to customize payment acceptance using dynamically generated buy buttons or widgets that capture payments from customers.

Various aspects of the API-Tool facilitates a multi-channel and multi-party merchandising and checkout from content publishing platforms. Examples of publishing platforms include online publishing systems, web and mobile publishing platforms, and/or the like that can support one or more data sources and user interfaces. In one embodiment, the API-Tool provides content publishers an avenue for monetizing content by offering merchandising and commerce marketplaces to their audiences. In another embodiment, the API-Tool supports content publishing platforms by providing a checkout solution that enables management of multiple content publishers and participating merchants. In a further embodiment, the API-Tool supports merchants by providing them a new distribution channel for their storefronts closer to potential customers within the applications or websites where those audiences spend their time online. The API-Tool may further support merchants by driving customers to their own websites or mobile applications by enabling merchants to embed or inject their storefront within destination applications or sites that their potential customers already use. In yet another embodiment, the API-Tool may provide digital wallet providers new channels for acquiring consumer enrollments, reselling, merchant acceptance and driving new sources of volume. Additional embodiments are described in the following application, which is incorporated herein by reference: U.S. patent application Ser. No. 13/966,098, filed Aug. 13, 2013 and entitled "Payment Platform Interface Widget Generation Apparatuses, Methods And Systems."

Provided below are descriptions of some devices (and components of those devices) that may be used in the systems and methods described above. These devices may be used, for instance, to receive, transmit, process, and/or store data related to any of the functionality described above. As would be appreciated by one of ordinary skill in the art, the devices described below may have only some of the components described below, or may have additional components.

For example, an exemplary mobile device may be a payment device that can be used to make payments, an access device (e.g., POS device) that may receive information from a consumer to conduct a transaction, and/or a multi-purpose general use device. The exemplary mobile device may comprise a computer readable medium that is present within the body (or outer casing) of the mobile device, or the computer readable medium could be detachable from the mobile device (e.g., the computer readable medium could comprise an external memory that could be connected through a physical interface such as a USB connection, or the data could be hosted remotely and accessed wirelessly by the device, e.g., the data could be hosted and stored at a remoter server in the "cloud"). The computer readable medium may be in the form of a memory that stores data. The memory may store information such as financial information, transit information (e.g., as in a subway or train pass), access information (e.g., access badges), serial numbers, mobile account information, and any other suitable information. In general, any of this information may be transmitted by the mobile device (such as to an access device), via any suitable method, including the use of antenna or contactless element. The body of the mobile device may be in the form a plastic substrate, housing, or other structure.

In some embodiments, the mobile device may further include a contactless element, which is typically implemented in the form of a semiconductor chip (or other data storage element) with an associated wireless transfer (e.g., data transmission) element, such as an antenna. Contactless element may be coupled to (e.g., embedded within) the mobile device and data or control instructions that are transmitted via a cellular network may be applied to the contactless element by means of a contactless element interface. The contactless element interface functions to permit the exchange of data and/or control instructions between the mobile device circuitry and an optional contactless element, or between another device having a contactless element (e.g., a POS terminal or a payment device). The contactless element may be capable of transferring and receiving data using a short range wireless communication capability. As noted above, mobile device may comprise components to both be the interrogator device (e.g., receiving data) and the interrogated device (e.g., sending data). Thus, the mobile device may be capable of communicating and transferring data or control instructions via both cellular network (or any other suitable wireless network, e.g., the Internet or other data network) and short range communications.

The mobile device may also include a processor (e.g., a microprocessor) for processing the functions of a phone and a display to allow a consumer to see phone numbers and other information and messages. The mobile device may further include input elements to allow a user to input information into the device, a speaker to allow the user to hear voice communication, music, etc., and a microphone to allow the user to transmit her voice through the mobile device. The mobile device may also include an antenna for wireless data transfer (e.g., data transmission).

A payment device may be in the form of a card. The payment device may comprise a plastic substrate. In some embodiments, a contactless element for interfacing with an access device may be present on, or embedded within, the plastic substrate. Consumer information such as an account number, expiration date, and/or a user name may be printed or embossed on the card. A magnetic stripe may also be on the plastic substrate. In some embodiments, the payment device may comprise a microprocessor and/or memory chips with user data stored in them.

As noted above, the payment device may include both a magnetic stripe and a contactless element. In some embodiments, both the magnetic stripe and the contactless element may be in the payment device. In some embodiments, either the magnetic stripe or the contactless element may be present in the payment device.

Figure 13A:
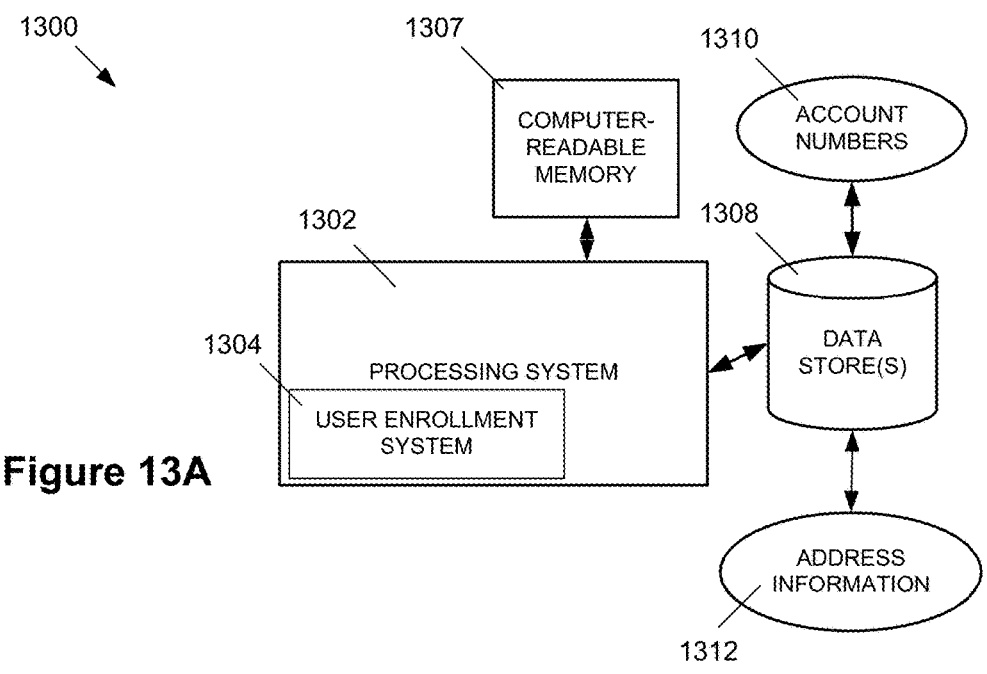
FIGS. 13A-13C depict example computer and software components that can be used with the operations described herein.
Figure 13B:
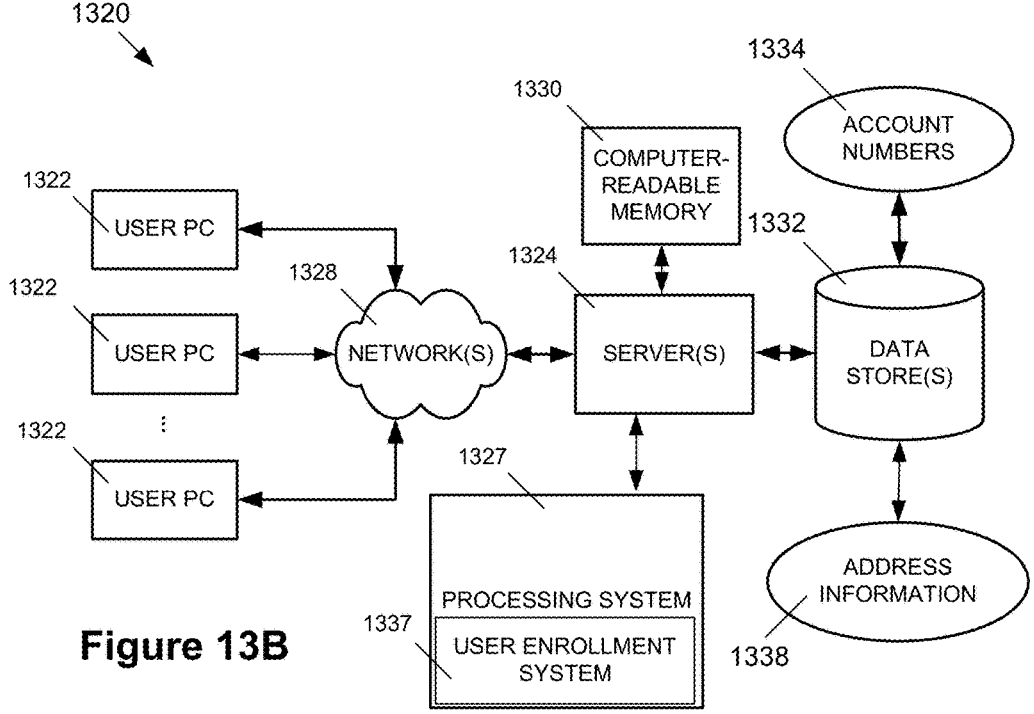
Figure 13C:
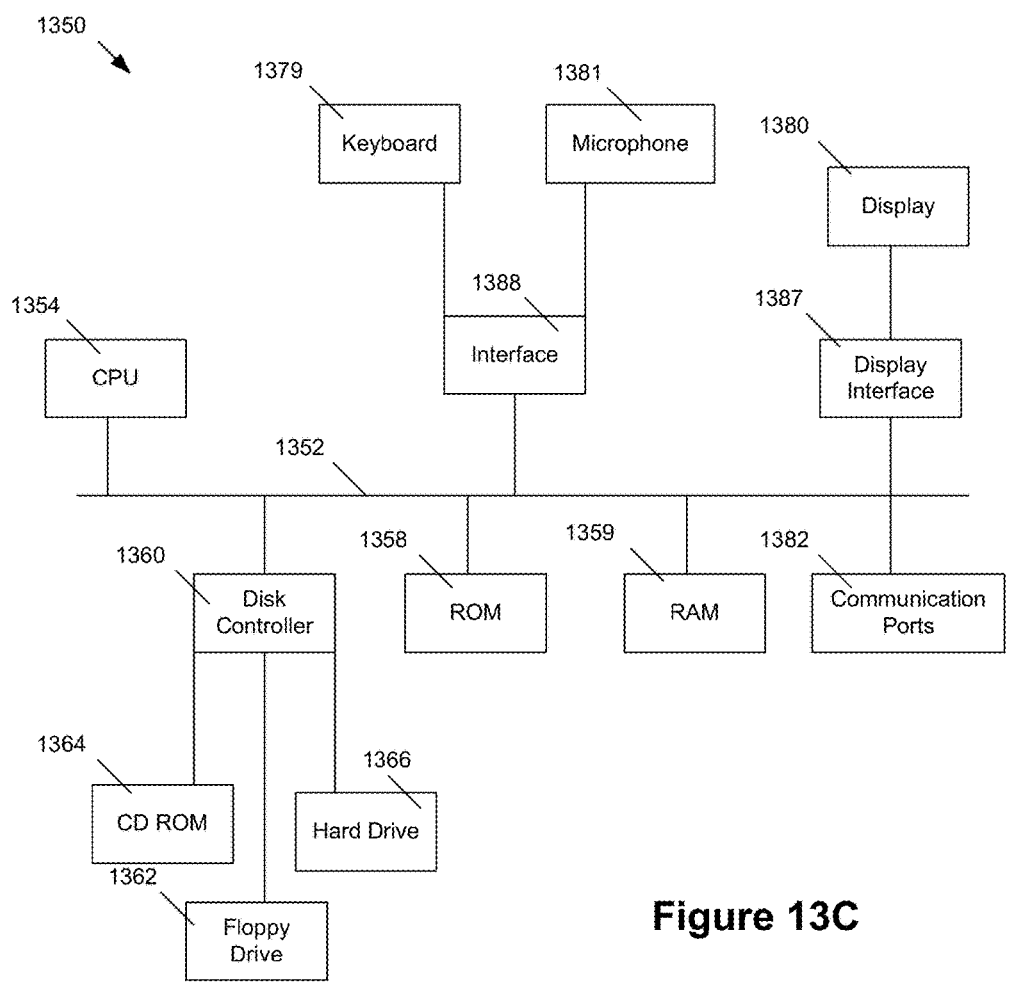

FIGS. 13A, 13B, and 13C depict example systems for enrolling a user in a membership account. For example, FIG. 13A depicts an exemplary system 1300 that includes a standalone computer architecture where a processing system 1302 (e.g., one or more computer processors located in a given computer or in multiple computers that may be separate and distinct from one another) includes a user enrollment system 1304 being executed on the processing system 1302. The processing system 1302 has access to a computer-readable memory 1307 in addition to one or more data stores 1308. The one or more data stores 1308 may include user account numbers 1310 as well as user address information 1312. The processing system 1302 may be a distributed parallel computing environment, which may be used to handle very large-scale data sets.

FIG. 13B depicts a system 1320 that includes a client-server architecture. One or more user PCs 1322 access one or more servers 1324 running a user enrollment system 1337 on a processing system 1327 via one or more networks 1328. The one or more servers 1324 may access a computer-readable memory 1330 as well as one or more data stores 1332. The one or more data stores 1332 may include user account numbers 1334 as well as user address information 1338.

FIG. 13C shows a block diagram of exemplary hardware for a standalone computer architecture 1350, such as the architecture depicted in FIG. 13A that may be used to include and/or implement the program instructions of system embodiments of the present disclosure. A bus 1352 may serve as the information highway interconnecting the other illustrated components of the hardware. A processing system 1354 labeled CPU (central processing unit) (e.g., one or more computer processors at a given computer or at multiple computers), may perform calculations and logic operations required to execute a program. A non-transitory processor-readable storage medium, such as read only memory (ROM) 1358 and random access memory (RAM) 1359, may be in communication with the processing system 1354 and may include one or more programming instructions for performing the method of enrolling a user in a membership account. Optionally, program instructions may be stored on a non-transitory computer-readable storage medium such as a magnetic disk, optical disk, recordable memory device, flash memory, or other physical storage medium.

In FIGS. 13A, 13B, and 13C, computer readable memories 1307, 1330, 1358, 1359 or data stores 1308, 1332, 1362, 1364, 1366 may include one or more data structures for storing and associating various data used in the example systems for enrolling a user in a membership account. For example, a data structure stored in any of the aforementioned locations may be used to store data including user information, computer-readable instructions for generating a prompt, payment processing requests, etc. A disk controller 1360 interfaces one or more optional disk drives to the system bus 1352. These disk drives may be external or internal floppy disk drives such as 1362, external or internal CD-ROM, CD-R, CD-RW or DVD drives such as 1364, or external or internal hard drives 1366. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1360, the ROM 1358 and/or the RAM 1359. The processor 1354 may access one or more components as required.

A display interface 1387 may permit information from the bus 1352 to be displayed on a display 1380 in audio, graphic, or alphanumeric format. Communication with external devices may optionally occur using various communication ports 1382.

In addition to these computer-type components, the hardware may also include data input devices, such as a keyboard 1379, or other input device 1381, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents. For example, the systems and methods can be used by both consumers and merchants operating in an omni-channel world where consumers have consistent omni-channel experience for authenticating, authorizing and adding cards to merchants. The systems and methods provide merchants with consistent omni-channel interfaces for receiving cards for proximity or e-commerce usage. Consumers are recognized across merchant applications to enable inviting, fast and easy adding of cards. Familiar dynamic issuer-branded button are also provided for proximity and e-commerce form factor.

What is claimed is:

1. A computerized method for adding a payment option to a payment service provider, comprising:
   identifying, by a computer system associated with a merchant, payment information stored within a profile of a user, wherein the payment information is collected from a payment device at a physical store of the merchant during processing of a transaction, wherein the merchant is the custodian of the profile and operates the physical store;
   transmitting the identified payment information to a payment service provider via a computer network;
   querying based on the merchant, by the computer system, a database of the payment service provider for a user account associated with the user for a membership with an online account with the merchant;
   in response to identifying the user account, retrieving, by the computer system, user information associated with the user account, said user information including an address information associated with the user and a mobile device associated with the user;
   determining, by the computer system, that the user account associated with the payment service provider does not contain the payment information;
   transmitting, by the computer system, a computer-executable command to the mobile device in response to the determination that the user account associated with the payment service provider does not contain the payment information;
   wherein the computer-executable command, in response to execution by the mobile device, triggers displaying of graphical user interface (GUI) on the mobile device to the user so that the user interacts with the computer system;
   receiving, by the computer system, a user request to cause the payment service provider to add a payment option to the user account based on the payment information; and
   transmitting, by the computer system, the payment information to the payment service provider in response to the received request and complete the transaction.

2. The method of claim 1, wherein payment information required for creating a checkout account is obtained from a merchant with whom the user is transacting.

3. The method of claim 1, wherein payment information is provided from currently entered information that was entered for a purpose different from creating a checkout account.

4. The method of claim 1, wherein if the card information is known to the payment service provider but not the merchant, then the user logs into the payment service provider and selects a card on file.

5. The method of claim 1, wherein if the card information is known to the merchant but not to the payment service provider, then the user requests the merchant transmit the card information to the payment service provider to create and link to a checkout account.

6. The method of claim 1, wherein if the card information is known to neither the merchant nor the payment service provider, then payment information entered by the user is used to create a checkout account.

7. The method of claim 6, wherein the payment information was entered by the user while checking out or adding a card to a merchant app.

8. The method of claim 1, wherein if the card information is known to both the merchant nor the payment service provider, then the user logs into the payment service provider to select a card on file for subsequent use.

9. The method of claim 1, wherein the checkout interface provided by the payment service provider is integrated with a merchant application for providing users with a consistent way to setup, link, and use checkout accounts of the payment service provider with the merchant product.

10. A computer-implemented system for adding a payment option to a payment service provider, comprising:
   a memory; and
   one or more processors disposed in communication with the memory and configured to issue processing instructions stored in the memory to:
   identify, by a computer system associated with a merchant, payment information stored within a profile of a user, wherein the payment information is collected from a payment device at a physical store of the merchant during processing of a transaction, wherein the merchant is the custodian of the profile and operates the physical store;
   transmit the identified payment information to a payment service provider via a computer network;
   query based on the merchant, by the computer system, a database of the payment service provider for a user account associated with the user for a membership with an online account with the merchant;
   in response to identifying the user account, retrieve, by the computer system, user information associated with the user account, said user information including an address information associated with the user and a mobile device associated with the user;
   determine, by the computer system, that the user account associated with the payment service provider does not contain the payment information;
   transmit, by the computer system, a computer-executable command to the mobile device in response to the determination that the user account associated with the payment service provider does not contain the payment information;
   wherein the computer-executable command, in response to execution by the mobile device, triggers displaying of graphical user interface (GUI) on the mobile device to the user so that the user interacts with the computer system;
   receive, by the computer system, a user request to cause the payment service provider to add a payment option to the user account based on the payment information; and
   transmit, by the computer system, the payment information to the payment service provider in response to the received request and complete the transaction.

11. The system of claim 10, wherein payment information required for creating a checkout account is obtained from a merchant with whom the user is transacting.

12. The system of claim 10, wherein payment information is provided from currently entered information that was entered for a purpose different from creating a checkout account.

13. The system of claim 10, wherein if the card information is known to the payment service provider but not the merchant, then the user logs into the payment service provider and selects a card on file.

14. The system of claim 10, wherein if the card information is known to the merchant but not to the payment service provider, then the user requests the merchant transmit the card information to the payment service provider to create and link to a checkout account.

15. The system of claim 10, wherein if the card information is known to neither the merchant nor the payment service provider, then payment information entered by the user is used to create a checkout account.

16. The system of claim 15, wherein the payment information was entered by the user while checking out or adding a card to a merchant app.

17. The system of claim 10, wherein if the card information is known to both the merchant nor the payment service provider, then the user logs into the payment service provider to select a card on file for subsequent use.

18. The system of claim 10, wherein the checkout interface provided by the payment service provider is integrated with a merchant application.

19. The system of claim 18, wherein the checkout interface provided by the payment service provider is integrated with the merchant application for providing users with a consistent way to setup, link, and use checkout accounts of the payment service provider with the merchant product.

20. A processor-readable non-transitory medium storing processor-issuable instructions to:
  identify, by a computer system associated with a merchant, payment information stored within a profile of a user, wherein the payment information is collected from a payment device at a physical store of the merchant during processing of a transaction, wherein the merchant is the custodian of the profile and operates the physical store;
  transmit the identified payment information to a payment service provider via a computer network;
  query based on the merchant, by the computer system, a database of the payment service provider for a user account associated with the user for a membership with an online account with the merchant;
  in response to identifying the user account, retrieve, by the computer system, user information associated with the user account, said user information including an address information associated with the user and a mobile device associated with the user;
  determine, by the computer system, that the user account associated with the payment service provider does not contain the payment information;
  transmitting, by the computer system, a computer-executable command to the mobile device in response to the determination that the user account associated with the payment service provider does not contain the payment information;
  wherein the computer-executable command, in response to execution by the mobile device, triggers displaying of graphical user interface (GUI) on the mobile device to the user so that the user interacts with the computer system;
  receive, by the computer system, a user request to cause the payment service provider to add a payment option to the user account based on the payment information; and
  transmit, by the computer system, the payment information to the payment service provider in response to the received request and complete the transaction.

* * * * *